United States Patent
Krstolic

[15] 3,659,984
[45] May 2, 1972

[54] RECIPROCAL FLUID NOZZLE FOR COOLING PARISON

[72] Inventor: Anthony J. Krstolic, Kansas City, Kans.
[73] Assignee: Phillips Petroleum Company
[22] Filed: Dec. 5, 1969
[21] Appl. No.: 882,606

[52] U.S. Cl..................................425/72, 425/326, 425/444
[51] Int. Cl.......................................................B29d 23/03
[58] Field of Search.....................18/5 B, 2 RM, 14 S, 14 T

[56] References Cited

UNITED STATES PATENTS

| | | | |
|---|---|---|---|
| 3,142,089 | 7/1964 | Wilkalis et al. | 18/5 BM |
| 2,922,194 | 1/1960 | Lampard et al. | 18/14 S X |
| 3,075,239 | 1/1963 | Strong | 18/5 BA X |
| 3,125,619 | 3/1964 | Miller | 18/5 BH |

FOREIGN PATENTS OR APPLICATIONS

| | | | |
|---|---|---|---|
| 1,495,618 | 8/1967 | France | 18/5 BA |
| 39/21129 | 9/1964 | Japan | 18/5 BR |
| 641,340 | 5/1962 | Canada | 18/5 BE |

Primary Examiner—J. Spencer Overholser
Assistant Examiner—Michael O. Sutton
Attorney—Young and Quigg

[57] ABSTRACT

In a blow molding machine, a nozzle for directing a stream of fluid such as air is attached to each mold half. On closing the molds, the nozzles move into position adjacent the parison and air is impinged on the portion of the parison between the top of the mold and the die. Thereafter, the air is discontinued and the air nozzles retracted with the mold halves to allow a stripper mechanism to tear the finished article free from the die.

4 Claims, 4 Drawing Figures

PATENTED MAY 2 1972　　　　　　　　　　3,659,984

INVENTOR.
A. J. KRSTOLIC

BY

*Young + Zuigg*

ATTORNEYS

RECIPROCAL FLUID NOZZLE FOR COOLING PARISON

BACKGROUND OF THE INVENTION

This invention relates to blow molding operations utilizing a stripper mechanism to tear the finished article free from a die.

While blow molding patents go back over 100 years, it has only been in the last dozen years or so that this fabrication technique has achieved significant commercial success. Modern blow molded containers now compete with such conventional packaging materials as paperboard, glass, and the like for packaging such items as milk, detergents, and the like. In order to effectively compete in such high volume, low profit margin areas, it is necessary to reduce the cycle time in the blow molding operation to an absolute minimum and to eliminate rejects as nearly as possible.

One area in which these factors must be considered is in the severing of the finished products from the portion of the parison extending from the die. This severing can be done by utilizing a knife which severs the parison flush with the die face, but this requires an additional mechanical element and thus is not the most desirable answer. Generally, therefore, the finished article is severed, simply by tearing it loose from the die. While this represents the optimum in simplicity of equipment design, certain problems are encountered. For one thing, the material tends to tear unevenly so that there is left a short cylinder of plastic depending from the die face which has uneven and stringy edges which tend to curl and touch the face of the die. This allows the buildup of polymer on the die with resultant contamination of the parison with charred polymer. Also, it tends to cause the bottom of the parison to bend to one side or the other so that as the parison is extruded for the next article, the end thereof is not always caught properly between the closing die members to effect a seal.

BRIEF SUMMARY OF THE INVENTION

It is an object of this invention to provide improved apparatus for blow molding hollow objects;

It is a further object of this invention to provide a simplified apparatus for severing a finished article from the die of the blow molding machine; and It is yet a further object of this invention to provide a more dependable severing of articles from the die of a blow molding machine.

BRIEF DESCRIPTION OF THE DRAWINGS

In the drawings, forming a part hereof, wherein like reference characters denote like parts in the various views.

DESCRIPTION OF THE PREFERRED EMBODIMENTS

The apparatus of the instant invention is applicable for the formation of all types of hollow articles such as bottles, toys, lampshades, and other molded items.

Any conventional extrusion means can be utilized for providing the melt for the dies to produce the tubular parisons.

The instant invention is applicable to the fabrication of blow molded articles from any thermoplastic polymer which can be blow molded. Exemplary of suitable polymers are polymers of at least one mono-1-olefin having two to eight carbon atoms per molecule, poly(vinyl chloride), polystyrene, nylon, polycarbonate, and the like.

While the fluid nozzles are shown in the FIGURES having a curved configuration which is the preferred embodiment, it is also within the scope of the invention to provide nozzles which are essentially straight, or have any configuration suitable for causing the fluid stream to impinge upon the parison a sufficient amount to cool the parison to a solid state around a definite line between the die face and the mold so that the material will tear along this line when the article is removed. It is essential that the fluid jet be directed selectively against the parison to the extent that the die itself is not cooled unduly.

While the invention is described primarily in terms of utilizing an air jet, it is within the scope of the invention to utilize any suitable cooling fluid.

It is essential to the invention that the cooling nozzles move with the mold halves as opposed to being fixed. This is necessary so as to allow the precise positioning of the stream of air which requires the nozzle to be close to the parison, and yet, to allow the stripper mechanism to move down without interference to remove the article.

Figure 1:
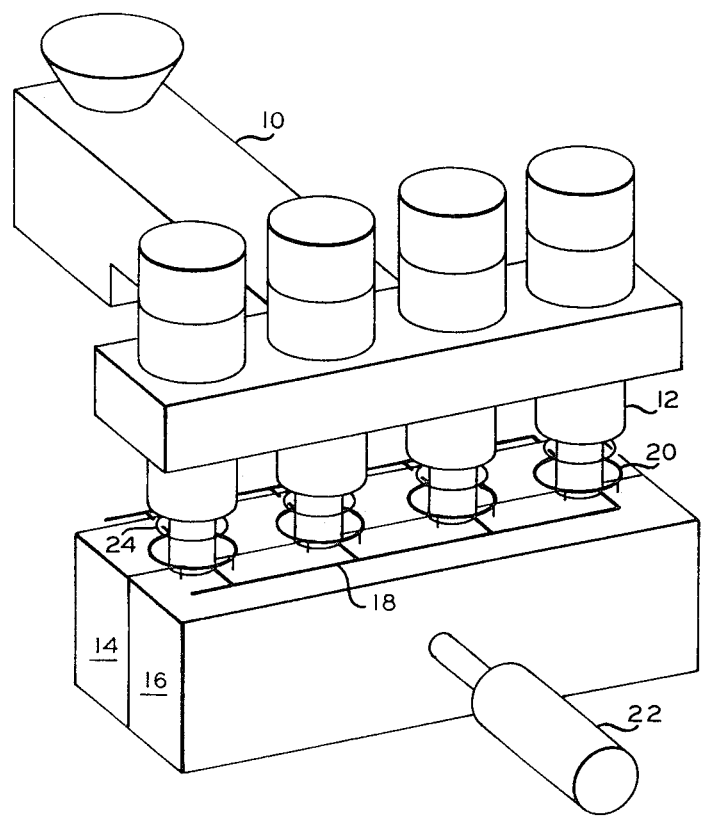
FIG. 1 is a schematic representation of a blow molding machine utilizing the cooling nozzles of the instant invention.

Referring now to the FIGURES, particularly FIG. 1, there is shown an extruder 10 having a plurality of dies 12. The parisons are extruded from die members 12 and mold halves 14 and 16 closed about them. Each mold half carries a cooling fluid nozzle means comprising a header 18 and semicircular nozzles 20. The mold halves are reciprocated into and out of position by means of cylinder 22. Stripper ring 24 moves downward after the mold halves are reciprocated back out of engagement through the action of cylinder 25 so as to push down on the molded article 26 to sever the article from the die face. This can best be seen in FIG. 2 where stripper ring 24 is shown in the depressed position, having just severed article 26 from the cylinder parison 28 depending from the face of die 12. The dotted lines show the position of stripper ring 24 prior to opening of the mold halves. As can be seen from FIG. 2, semicircular nozzles 20 are retracted with the mold halves 14 and 16 so that stripper ring 24 can clear. Tail portion 30 and scrap portion 32 are trimmed from the article 26 in a post-forming operation in a manner conventional in the art.

Figure 3:
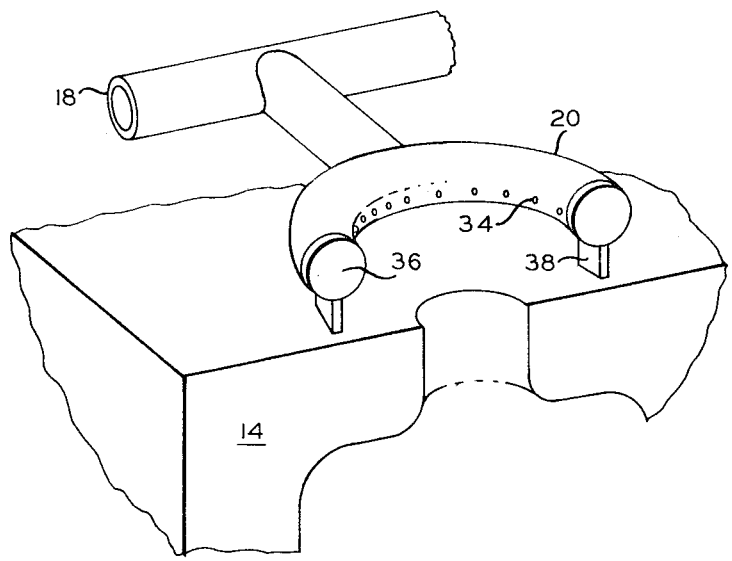
FIG. 3 is a detailed view of a nozzle of FIG. 1.

Referring now specifically to FIG. 3, nozzle 20 is shown in greater detail. As can be seen from this view, nozzle 20 has orifices 34 to direct a flow of gaseous fluid toward the parison. Each end of the nozzle has a solid plate 36 to prevent escape of fluid from the ends. The nozzle is attached to mold half 14 by means of post 38.

Figure 4:
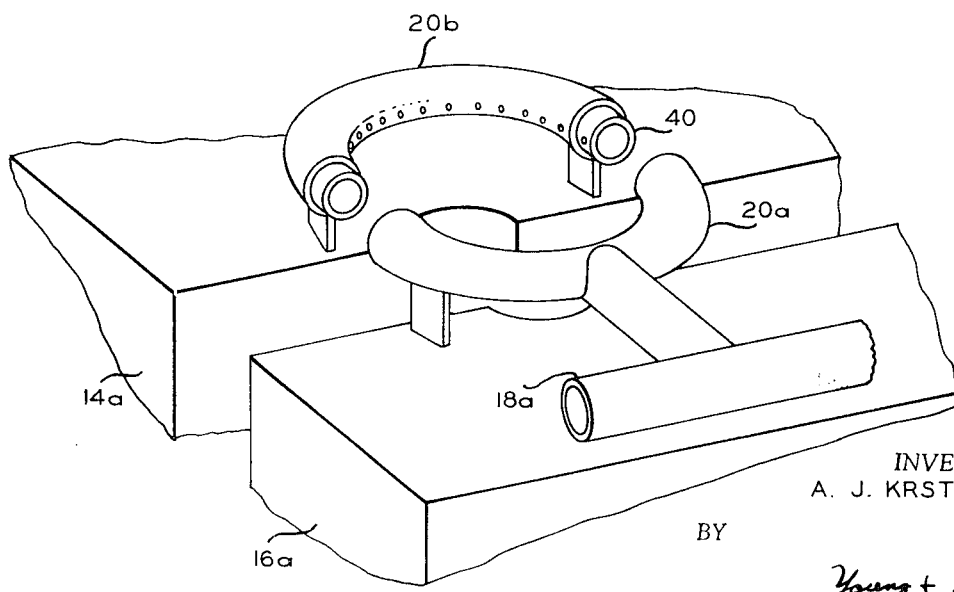
FIG. 4 is a perspective view of a mold arrangement utilizing an alternate configuration for the fluid nozzles.

FIG. 4 shows an alternate embodiment wherein mold halves 14a and 16a carry semicircular nozzles 20a and 20b. Nozzle 20a is connected to header 18a which is the source of gaseous fluid. As mold halves 14a and 16a close, ring 20a slips over coupling 40 so that fluid from header 18a is introduced into both semicircular nozzles.

Figure 2:
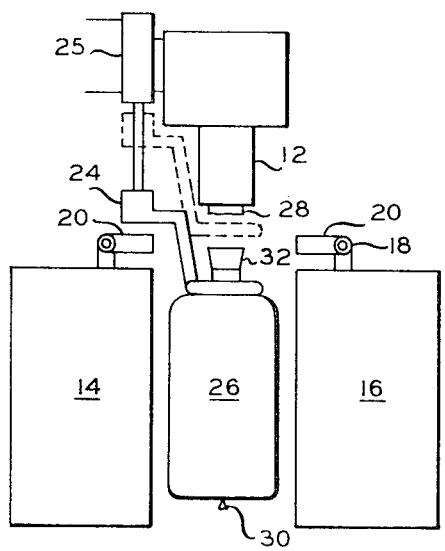
FIG. 2 is a side view in greater detail showing the relationship of the stripper ring to the nozzles.

As can be seen from FIG. 2, the sequence of the steps is as follows: Parison 28 is extruded downward from die 12 to a point adjacent the bottom of mold halves 14 and 16. Thereafter, mold halves 14 and 16 close, carrying with them nozzles 20. After the mold halves have closed, pinching off the bottom of the parison, internal fluid pressure is introduced into the interior of the parison to expand same out into contact with the forming surfaces of mold halves 14 and 16 while the air is impinged on a portion of the parison between the top of the mold halves and the face of die 12. Thereafter, the cooling air is discontinued, the mold halves opened, and stripper mechanism 24 lowered to tear the parison at a point adjacent the die face. Because the parison in this area and below has been cooled by the air from nozzles 20, it tears evenly at a point just below the die face as opposed to the ragged tear which would otherwise occur.

EXAMPLE

One gallon milk bottles were blow molded from 0.960 density (ASTM D 1505–63T), 0.9 melt index (ASTM D 1238–62T, Condition E), ethylene homopolymer. The parisons were extruded from a die utilizing an apparatus similar to that shown in FIGS. 1–3. Mold halves were closed about the parison to seal off the bottom end thereof and internal fluid pressure introduced to expand same out against the mold walls. During the time the parison was being expanded into conformity with the mold walls, a stream of air from a set of air nozzles carried on the mold halves was impinged upon the portion of the parison between the top of the mold wall and the die face to cool same. The apparatus was provided with an annular stripping ring around the parison adjacent the die face. The mold halves were then opened, carrying with them the nozzle means for producing the cooling jet of gaseous fluid and the annular ring adjacent the die face was moved axially downward contacting the shoulder of the milk bottle and moving it sharply downward to tear the parison from the die face. The parison tore along an even line around the circumference of the parison. On subsequent cycles, it was found that there was no noticeable accummulation of polymer buildup on the die face and a good bottom seal was achieved each time.

While this invention has been described in detail for the purpose of illustration, it is not to be construed as limited thereby, but is intended to cover all changes and modifications within the spirit and scope thereof.

I claim:
1. Apparatus comprising in combination:
an extrusion die;
two reciprocal mold halves adapted to move into engagement under said die;
fluid jet nozzle means fixedly attached to each of said mold halves, said nozzles being so disposed as to direct a stream of fluid on a portion of a parison between said mold and a face of said die;
a stripping mechanism adjacent said die;
means to reciprocate said mold halves into and out of engagement;
means to blow fluid out of said nozzles and onto the parison; and
means to move said stripper mechanism down while said mold halves and nozzles are in retracted position so as to tear an article formed in said mold halves from said die.

2. Apparatus according to claim 1 wherein each nozzle comprises a half circle.

3. Apparatus according to claim 1 wherein the nozzle on only one mold is connected with said means for introducing fluid and the other nozzle is adapted to couple with said nozzle connected to said means for introducing fluid in a manner such that fluid from the first nozzle can pass into the second nozzle.

4. Apparatus according to claim 1 wherein said stripping mechanism comprises an annular ring.

* * * * *